United States Patent [19]

Piltch

[11] 4,323,035
[45] Apr. 6, 1982

[54] SQUIRREL-PROOF BIRD FEEDER

[76] Inventor: Abraham Piltch, 9618 Dilston Rd., Silver Spring, Md. 20903

[21] Appl. No.: 119,196

[22] Filed: Feb. 6, 1980

[51] Int. Cl.³ .............................................. A01K 39/01
[52] U.S. Cl. ................................................. 119/51 R
[58] Field of Search ............... 119/23, 63, 51 R, 52 R; 222/167, 519, 520, 521

[56] References Cited
U.S. PATENT DOCUMENTS

| | | | |
|---|---|---|---|
| 2,392,245 | 1/1946 | Huszar | 222/167 X |
| 2,520,718 | 8/1950 | Hanson | 222/171 |
| 3,126,870 | 3/1964 | Matthew | 119/63 X |
| 3,526,341 | 9/1970 | Johnston | 222/167 |
| 3,537,429 | 11/1970 | Regan | 119/51 R |
| 3,788,279 | 1/1974 | Boehland, Jr. | 119/52 R |

*Primary Examiner*—Gene Mancene
*Assistant Examiner*—Robert P. Swiatek
*Attorney, Agent, or Firm*—Ira C. Edell

[57] ABSTRACT

Access to a bird feeder by squirrels is prevented by providing a rotatable member which must be stepped upon by the squirrel to reach the feeder. The member preferably has a low friction surface and, when it rotates, causes the squirrel to fall to the ground.

7 Claims, 6 Drawing Figures

SQUIRREL-PROOF BIRD FEEDER

TECHNICAL FIELD

The present invention relates to improved bird feeders. More particularly, the invention relates to an arrangement for preventing access to bird feeders by squirrels and other rodents.

BACKGROUND OF THE INVENTION

In many areas squirrels and other rodents are terrible nuisances for bird lovers who set up bird feeders. Specifically, squirrels can readily traverse wires or ropes from which bird feeders are suspended and can easily climb vertical ground supports for other types of bird feeders. Upon reaching the bird feeders the squirrels scare away the birds while emptying the feeder of its contents. Anyone who has attempted to prevent squirrels from gaining access to bird feeders can attest to the cunning and ingenuity of these animals in overcoming obstacles.

It is therefore an object of the present invention to provide a bird feeder arrangement having means for preventing access to the feeder by squirrels and other rodents. More particularly, the object of this invention is to provide a bird feeder arrangement wherein the feeder is strictly for the birds.

DISCLOSURE OF THE INVENTION

In accordance with the present invention, a rotatable member is disposed so as to be stepped upon by a squirrel in order to gain access to a bird feeder. The member rotates when stepped upon and causes the squirrel to fall to the ground.

In one embodiment the rotatable member is interposed in a support line for a conventional feeder, between the feeder and a support therefor. In a further embodiment the feeder itself incorporates a rotatable housing which serves as the rotatable member.

BRIEF DESCRIPTION OF THE DRAWINGS

The above and still further objects, features and advantages of the present invention will become apparent upon consideration of the following detailed description of one specific embodiment thereof, especially when taken in conjunction with the accompanying drawings, wherein.

BEST MODE OF CARRYING OUT THE INVENTION

Figure 1:
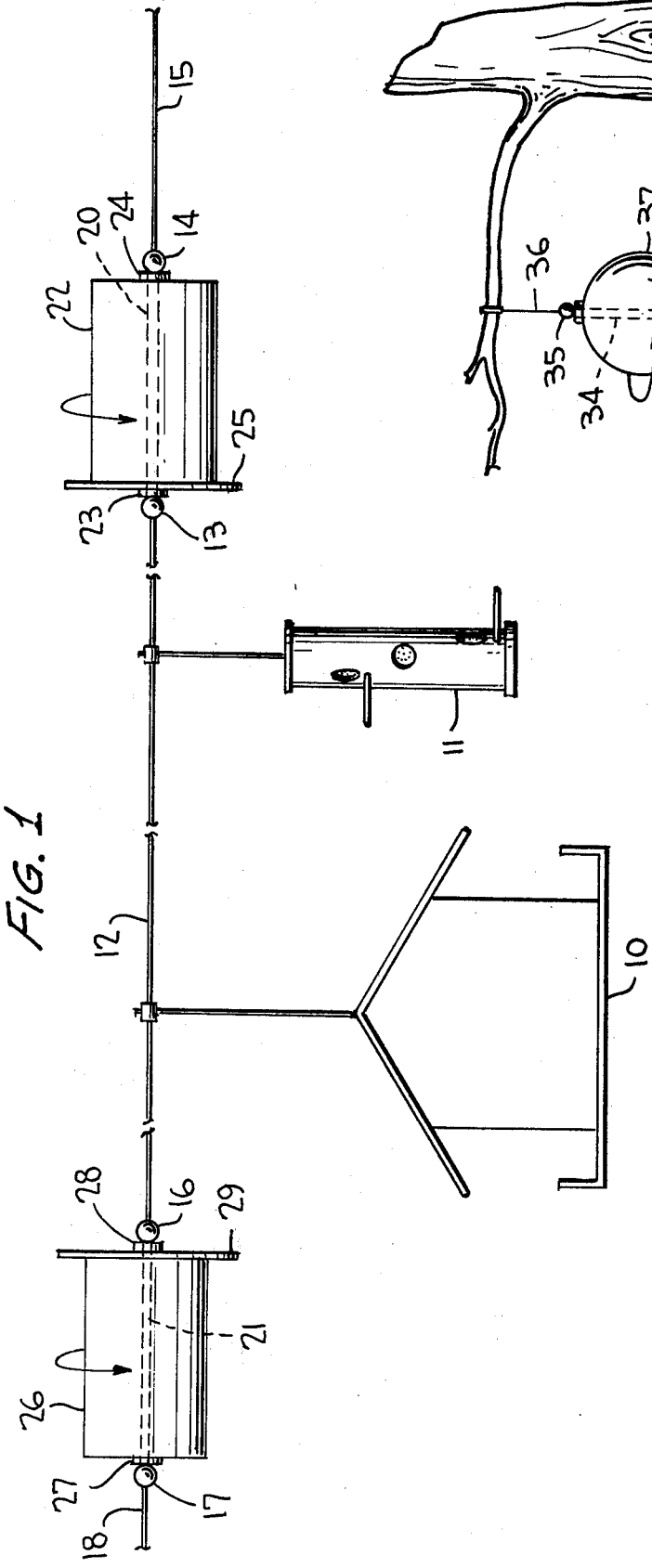
FIG. 1 is a plan view of an arrangement according to the present invention wherein conventional bird feeders are suspended from a line incorporating protective devices against rodents.

Referring specifically to FIG. 1 of the accompanying drawings, conventional bird feeders 10, 11 are suspended from a line 12 which preferably is a wire but may also be a rope, chain, or other similar line support. The diameter of the line is not critical but is preferably as small as possible to make traversal by a rodent difficult. Line 12 is supported horizontally in a manner described below. One end of line 12 is connected to an end 13 of a shaft or rod member 20, the other end 14 of which is connected to a further line 15. The other end of line 12 is connected to an end 16 of a further shaft or rod member 21 the other end 16 of which is secured to a line 18.

A cylinder 22 is mounted for free rotation about its horizontally disposed longitudinal axis on rod 20. For this purpose, cylinder 22, which is preferably hollow, is closed at its ends and may be provided with annular journal end supports 23, 24 through which rod 20 passes. The inboard end (i.e. the end nearest the supported bird feeders 10,11) of cylinder 22 is preferably of larger diameter than the diameter of the cyliner 22, thereby forming an annular flange-like member 25 concentrically about rod 20. A further cylinder 26 is mounted for free rotation about its horizontally disposed longitudinal axis or rod 21. For this purpose, cylinder 26, which is preferably hollow, is closed at its ends and may be provided with journal end supports 27, 28 through which rod 21 passes. The inboard end of cylinder 26 is preferably of larger diameter than that of cylinder 26, thereby forming annular flange-like member 29 concentrically about rod 21.

Cylinders 22 and 26 may be of plastic, metal or other suitable material. What is important is that the surface of the cylinders be low-friction and hard, to prevent a rodent from digging its claws into the cylinder. It is also desirable that the cylinders be of sufficient length to prevent a squirrel from effecting a simple leap over the cylinder from line to line. In this regard, the cylinder should have a length on the order or eight inches or more. Likewise, the cylinder diameter should be at least five inches.

In operation, lines 15 and 18 are strung between two supports (not shown) such as trees, poles, structures, etc. A squirrel or other rodent attempting to reach a bird feeder 10, 11 from a support must traverse line 15 (or 18) and cylinder 22 (or 26). When the squirrel steps on the cylinder it will rotate about the rod 20 (or 21). The hard, low-friction surface of the cylinder prevents the squirrel from gaining a foot-hold so that as the cylinder rotates the squirrel is caused to fall to the ground. The flange 25 (or 29) is sufficiently large to preclude the possibility of the squirrel successfully attempting a quick scamper or leap across the cylinder. In this regard, part of the effectiveness of the flange is the psychological effect it presents to the squirrel who is unlikely to attempt a quick leap or scamper to a location beyond the cylinder when he cannot see what is beyond the cylinder. It is, of course, possible to have a flange at the outboard end also, adding both to the squirrel's physical and psychological difficulties.

Figure 2:
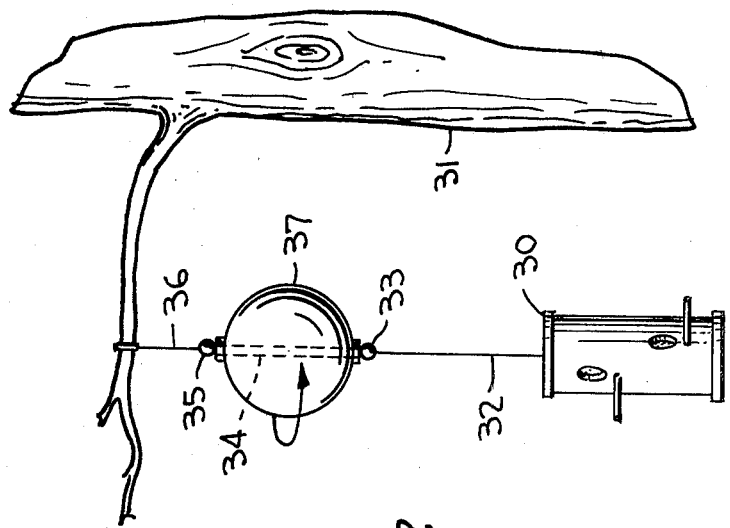
FIG. 2 is a plan view of another embodiment wherein a conventional bird feeder can be vertically suspended and be protected against rodents.

Another embodiment of the invention is illustrated in FIG. 2 wherein a bird-feeder 30 is suspended vertically from a limb of a tree 31. The feeder is connected to a line 32 which is suspended from one end 33 of a vertical shaft or rod 34. The other end 35 of rod 34 is suspended from a further line 36 which is secured to the tree limb. A sphere 37 is mounted for vertical rotation about rod 34. Sphere 37 has a smooth, hard surface which precludes a rodent from grabbing onto the sphere surface. Also, the sphere should preferably have a diameter of at least six inches. If a rodent attempts to climb down from the tree limb to the suspended feeder 30, it must traverse the sphere 37. The hard, smooth sphere surface will cause the rodent to slip, resulting in the rodent attempting to scamper along the sphere. To the extent that the rodent can gain any foothold at all on the sphere, the scampering action tends to cause the sphere to rotate about the rod 34, with the result that the rodent loses its balance and falls to the ground.

It should be noted that the embodiment of FIG. 1, wherein the rotatable member rotates about a horizontal axis, is more effective in causing a rodent to fall to the ground than is the FIG. 2 embodiment wherein the rotatable member rotates about a vertical axis. Nevertheless, the FIG. 2 embodiment is quite useful for the intended purpose.

Figure 3:
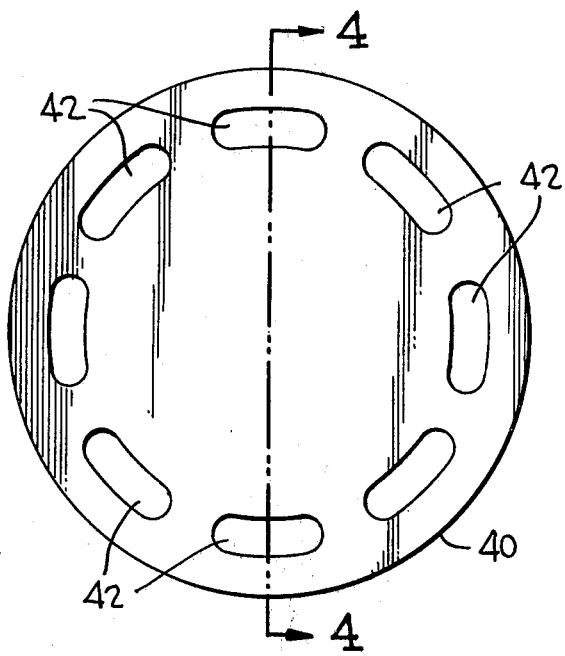
FIG. 3 is an end view in plan of a bird feeder incorporating the protective feature of the present invention.
Figure 4:
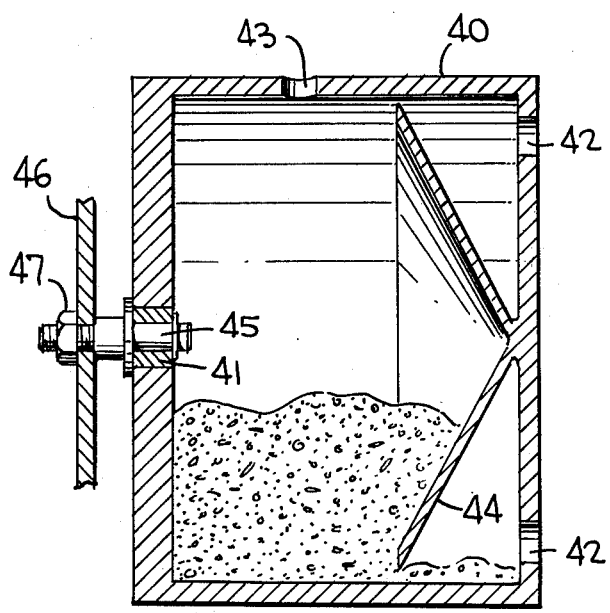
FIG. 4 is a view in section taken along lines 4—4 of FIG. 3.

The embodiments of FIGS. 1 and 2 relate to preventing rodents from obtaining access to conventional bird feeders. It is also possible to build protection against rodent access directly into bird feeders. One such bird feeder is illustrated in FIGS. 3 and 4 to which reference is now made. A hollow cylindrical housing 40 is provided with a bearing 41 in one of its longitudinal ends. The other of its longitudinal ends is provided with a plurality of access openings 42 which are sized to permit birds to enter and leave the housing. A filler hole 43 is defined through the side of the housing 40 to permit bird feed to be poured into the housing. The filler hole may be sealed with a plug or, alternatively, a leaf spring may be mounted on the inside wall of the cylinder to block outflow of bird feed when the filler is directed downward but which flexes to permit bird feed to be poured into the housing by means of a funnel or spout. A baffle member 44 of generally conical configuration is secured at its apex to the center of the housing end wall in which access openings 42 are defined. Baffle member 44 serves to regulate flow of bird seed through the feeder.

A fixed shaft 45 is secured to a wall 46 of a support structure by means of a lock nut 47 or any other suitable engagement means so that the shaft extends horizontally from the wall. The projecting end of shaft 45 is journaled in bearing 41 of the housing 40, thereby rendering housing 40 rotatable about the shaft. If a squirrel or other rodent manages to reach the feeder housing 40, the housing tends to rotate and drop the squirrel to the ground. In this regard, the housing 40 is made with a hard smooth finish to prevent the squirrel from gaining a toe-hold.

If desired, bird access openings may be sized to admit birds of desired size, thereby limiting depredation by undesired species, such as the starling. Also, the shaft 45 can be extended so as to be journaled, and thereby supported, in both end walls of the cylinder.

Figure 5:
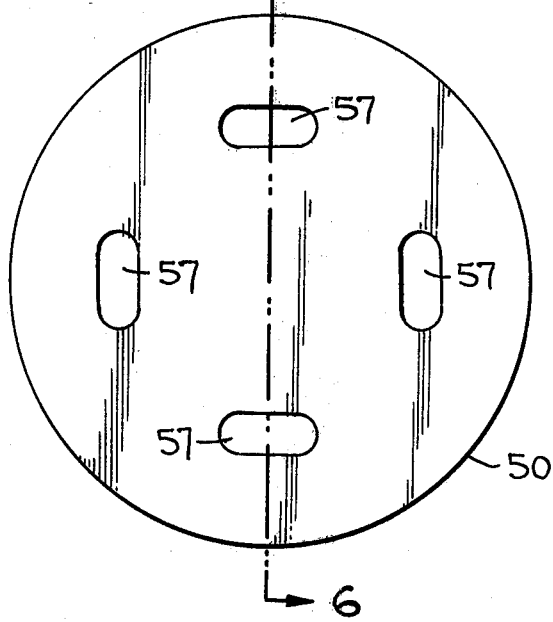
FIG. 5 is an end view of another bird feeder constructed in accordance with the present invention.
Figure 6:
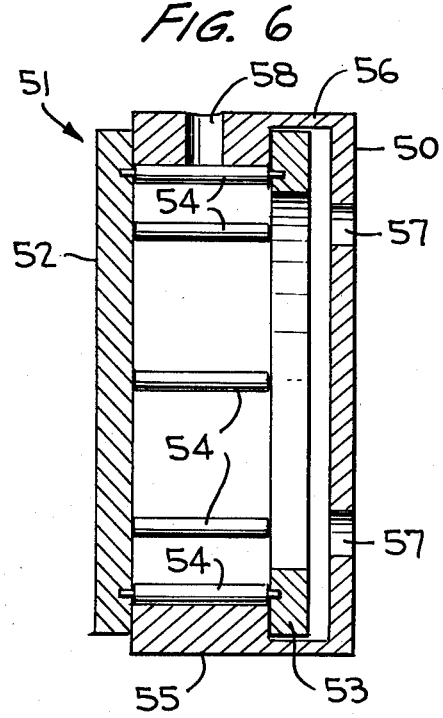
FIG. 6 is a view in section taken along lines 6—6 of FIG. 5.

A second embodiment of a bird feeder having built-in protection against rodent access is illustrated in FIGS. 5 and 6. A housing 50 is in the form of a cylindrical cup which rotatably engages a mounting member 51. Specifically, mounting member 51 includes a solid plate member 52 and an annular plate 53 secured in fixed parallel relation to one another by means of plural bearing members 54. Bearing members 54 may be smooth-surfaced cylinders which are fixed; alternatively, such cylinders may rotate about their longitudinal axes to serve as rollers for the purpose described below. In either case, the bearing members 54 are spaced angularly from one another at a fixed radial location about annular plate 53.

The interior of housing 50 has a first section 55 of lesser diameter, which diameter is just slightly greater than the diameter of an imaginary cylindrical surface connecting the bearing members. A second section 56 of the interior of housing 50 is of larger diameter to accomodate the diameter of annular plate 53. Housing 50 snap fits onto mounting member 51 so that section 55 slidably engages the bearing members 54, whereby the housing is free to rotate about its longitudinal axis relative to mounting member 51. Bird access openings 57 are defined in the housing end wall remote from plate 52. A filler opening 58 is defined in the housing side wall and may be provided with a suitable cover to prevent spilling. Although not shown in FIG. 6, a baffle, such as baffle 44 of FIG. 4, may be provided to moderate bird seed flow.

It is clear that a squirrel which reaches housing 50 will cause the housing to rotate, resulting in the squirrel falling to the ground.

In both rotatable feeders described, the use of transparent or translucent materials in at least the end faces will permit viewing of the birds within the feeders.

While I have described and illustrated specific embodiments of my invention, it will be clear that variations of the details of construction which are specifically illustrated and described may be resorted to without departing from the true spirit and scope of the invention as defined in the appended claims.

I claim:

1. Apparatus for preventing squirrels and other rodent-like animals from obtaining access to a bird feeder, said apparatus comprising:
    support means for supporting the bird feeder; and
    rotatable means arranged to rotate relative to said support means when walked upon by the animal;
    wherein said bird feeder and said rotatable means are one and the same;
    wherein said support means comprises first and second plates, said second plate having an annular configuration, and bearing means for securing said first and second plates in parallel spaced relation to one another, said bearing means comprising a plurality of bearing members extending between and secured to said plates and arranged to define a generally cylindrical path; and
    wherein said bird feeder comprises a generally cylindrical cup-like member arranged to fit over said second plate and said bearing means such that the interior of said cup slidably engages said bearing means.

2. Apparatus according to claim 1 further comprising: bird access openings defined in said cup-like member; and a filler hole defined in said cup-like member.

3. A selective bird feeder comprising:
    container means receiving and storing feed material for removal therefrom by birds, said container means including a substantially imperforate peripheral wall defining a hollow interior, said peripheral wall surrounding and being radially spaced from a horizontally-extending longitudinal axis of said container means; and
    support means mounting said container means for free rotational movement of said peripheral wall about said longitudinal axis in response to application of a rotative force to said peripheral wall;
    wherein said container means further includes at least one end wall disposed generally perpendicular to said axis, and wherein said end wall includes at least one access opening defined therethrough and sized to permit access by birds smaller than a predetermined size into said hollow interior;

and wherein said container means further includes a second end wall disposed generally parallel to said one end wall, wherein said support means comprises a fixed horizontal shaft, and wherein at least one of said end walls of said container means has bearing means defined therein for receiving said shaft along said longitudinal axis to permit free rotation of said container means about said shaft.

4. The selective bird feeder according to claim 3 further comprising baffle means disposed within said hollow interior for moderating the flow of feed material through said container means.

5. A selective bird feeder comprising:

container means receiving and storing feed material for removal therefrom by birds, said container means including substantially imperforate peripheral wall defining a hollow interior, said peripheral wall surrounding and being radially spaced from a horizontally-extending longitudianl axis of said container means; and support means mounting said container means for free rotational movement of said peripheral wall about said longitudinal axis in response to application of a rotative force to said peripheral wall;

wherein said container means further includes at least one end wall disposed generally perpendicular to said axis, and wherein said end wall includes at least one access opening defined therethrough and sized to permit access by birds smaller than a predetermined size into said hollow interior;

and wherein said support means includes: first and second plates, said second plate having an annular configuration, and bearing means for securing said first plate to said second plate in parallel spaced relation, said bearing means comprising a plurality of bearing members disposed between said plates and defining a generally cylindrical path; and wherein said container means comprises a cup-like member which is open at an end opposite said one end wall, said cup-like member having an interior surface of said peripheral wall which is configured to ride along the cylindrical path defined by said bearing members when said container means is rotated relative to said support means.

6. The selective bird feeder according to claim 5, wherein said second plate has a diameter greater than the diameter of the cylindrical path defined by said bearing members, and wherein said interior surface of said peripheral wall has an annular recess for accommodating said second plate as said interior surface rides along said bearing members.

7. A selective bird feeder comprising:

container means receiving and storing feed material for removal therefrom by birds, said container means including substantially imperforate peripheral wall defining a hollow interior, said peripheral wall surrounding and being radially spaced from a horizontally-extending longitudinal axis of said container means;

support means mounting said container means, with said axis horizontal, for free rotational movement of said peripheral wall about said longitudinal axis in response to application of a rotative force to said peripheral wall;

wherein said peripheral wall includes a sealable filler hole defined therethrough for admitting bird feed into said hollow interior;

wherein said container means further includes at least one end wall disposed generally perpendicular to said axis, said end wall including at least one access opening defined therethrough and sized to permit birds smaller than a predetermined size to have access to said hollow interior;

and further comprising baffle means at least partially spaced from said end wall for restricting flow of bird feed toward said access opening from said baffle means to said end wall.

* * * * *